United States Patent [19]
Peterson

[11] Patent Number: 5,255,893
[45] Date of Patent: Oct. 26, 1993

[54] GATE VALVE HAVING REMOVABLE SEALS

[76] Inventor: L. Neil Peterson, 3324 S. Simpson Rd., Salina, Kans. 67401

[21] Appl. No.: 941,956

[22] Filed: Sep. 8, 1992

[51] Int. Cl.$^5$ ............................................. F16K 3/02
[52] U.S. Cl. ................................. 251/328; 137/242; 251/193; 251/329
[58] Field of Search .............. 137/242; 251/193, 328, 251/329

[56] References Cited

U.S. PATENT DOCUMENTS

| | | | |
|---|---|---|---|
| 4,221,307 | 9/1980 | Peterson | 251/328 X |
| 4,546,788 | 10/1985 | Stalder et al. | 137/242 |
| 4,938,250 | 7/1990 | Peterson | 251/328 X |

Primary Examiner—Gerald A. Michalsky
Attorney, Agent, or Firm—Shook, Hardy & Bacon

[57] ABSTRACT

A knife gate valve is provided with peripheral seals which can be removed for cleaning and inspection without having to remove the valve from the duct or other conduit to which the valve is mounted. The longitudinal seals are pressure loaded and seat against the edge rather than the face of the gate. The seals are shielded from the abrasive effects of the material flowing through the valve by peripheral spaced apart beams which project into the valve opening. A series of cutouts in the beams allows the space between the beams to be cleaned of any accumulated material during reciprocation of the gate.

23 Claims, 3 Drawing Sheets

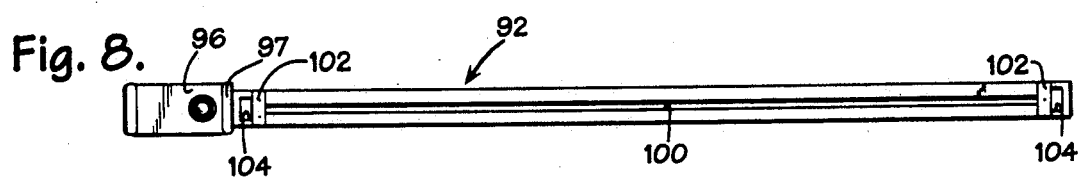
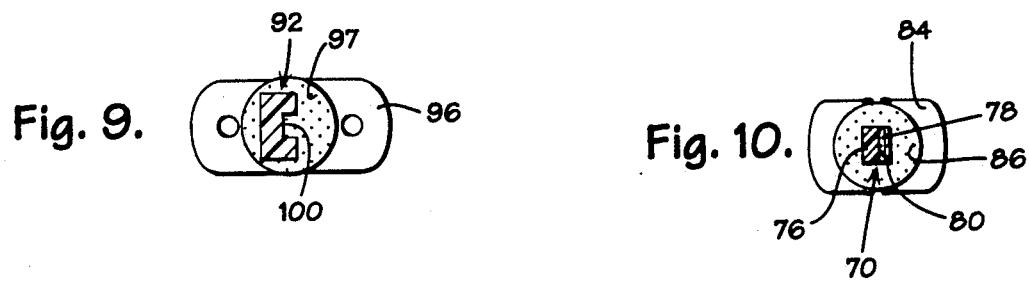
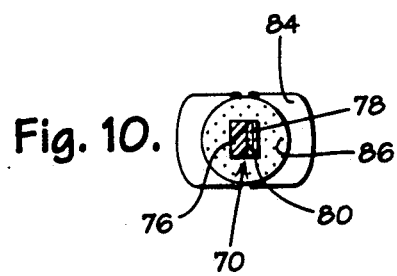
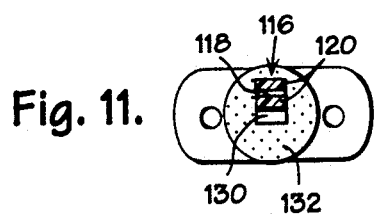
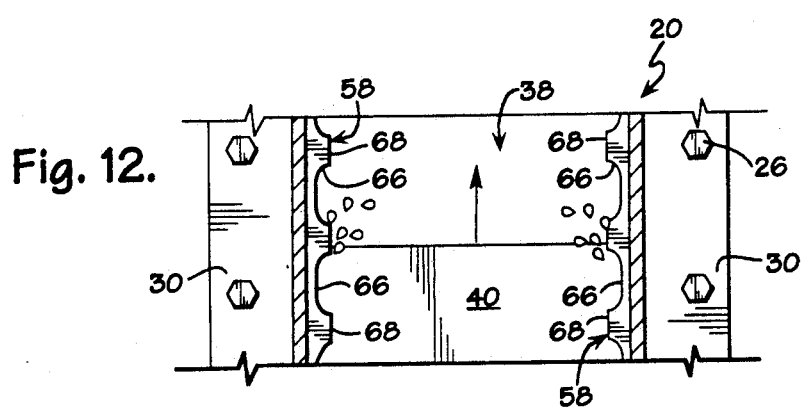
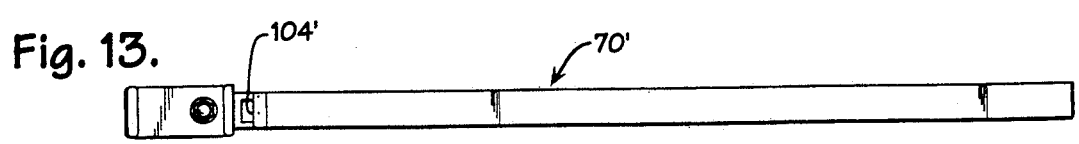

GATE VALVE HAVING REMOVABLE SEALS

BACKGROUND OF THE INVENTION

This invention relates in general to the handling of dry bulk materials, and, more particularly, to knife gate valves that are used to control the flow of such materials.

Knife gate valves are commonly used in pneumatic or vacuum conveyance systems that are used to convey various types of dry bulk materials such as grains and other foods as well as non-food materials such as plastics. In order to prevent the leakage of air or vacuum, sealing surfaces must be provided to contact the gate when it is moved to its closed position. These sealing surfaces, even when made of wear resistant materials, must be periodically replaced. In my previous U.S. Pat. No. 4,938,250, I disclosed transverse seals at the rear or aft end of the gate opening which seat against the opposed faces of the gate. These seals can be accessed for inspection and renewal without removing the valve from service. While access to the seals in this manner is highly desirable, the valve still must be removed from service in order to inspect and renew the longitudinal seals and the forward transverse seal. In addition, the valve must be periodically disassembled in order to clean and sterilize the seals and the channels in which they are seated. This cleansing is particularly important and must be frequently performed when the gate valve is used in conjunction with food and drug processing.

SUMMARY OF THE INVENTION

It is a primary object of this invention to provide a gate valve having seals which allow the valve to be used in pneumatic or vacuum systems for controlling the flow of solid material particles and which seals can be removed for inspection and replacement while the valve remains in service so that operational downtime is minimized.

It is another object of this invention to provide a gate valve having seals which can be removed to provide access to the channels in which the seals are housed so that the channels can be purged with a pressurized fluid to provide the cleanliness required in many types of applications without having to remove the valve from service.

It is another object of this invention to provide a gate valve having a device which acts to clean the solid particles off of the face of the gate which is exposed to the flow of particles so that the particles do not interfere with the sealing action of the gate seals.

It is another object of this invention to provide a gate valve having a device which cleans the solid particles off of the periphery of the face of the gate which is exposed to the flow of particles, thereby reducing the opportunity for the particles to accumulate between the gate and either the support members or seals where they might cause seizing or binding of the gate.

It is a further object of this invention to provide a gate valve having longitudinal and forward support beams which are positioned to support the gate as it moves between the open and closed positions and which are configured to clean the solid particles off of the periphery of the gate face, thereby reducing the opportunity for material to accumulate and cause contamination of other material flowing through the gate valve.

It is a still further object of this invention to provide a gate valve as described which utilizes pressure-loaded edge seals which seat against the side edges rather than the face of the gate and which are shielded from the flow of material so that they are protected from the abrasive action of the material flowing through the gate.

It is still another object of the invention to provide a gate valve with pressure-loaded edge seals which are shielded from the flow of material to reduce the opportunity for the accumulation of material on the seals while still providing the large sealing pressure required to prevent leakage of air or vacuum from the valve.

It is yet a further object of this invention to provide a gate valve as described which can be readily adapted to provide various inlet and outlet configurations so that the valve is suitable for use in many diverse applications.

To accomplish these and other related objects, in one aspect the invention is directed to a gate valve for controlling the flow of solid material particles, said gate valve comprising:

a valve housing presenting an opening through which the solid material particles may flow;

a gate coupled with the housing and moveable between a closed position blocking the opening and an open position in which the flow opening is unblocked, said gate having opposed faces, a leading edge and longitudinal side edges;

an actuator coupled with the gate for moving the gate between the open and closed positions;

a pair of longitudinal channels formed in said housing adjacent said opening and at opposite sides thereof;

longitudinal pressure loaded seals positioned within the longitudinal channels and in sealing contact with the longitudinal side edges of the gate when the gate is in the closed position; and a pair of apertures in said housing, one of said pair of apertures in alignment with an end of one of said pair of longitudinal channels and the other of said pair of apertures in alignment with an end of the other of said pair of longitudinal channels, said apertures being sized to permit insertion of the longitudinal pressure loaded seals through said apertures and into said channels and removal therefrom.

In another aspect, the invention is directed to a plurality of cutouts providing along an inner edge of side beams in the housing to facilitate removal of particles of material from between the side beams as the gate is opened and closed.

Brief Description of the Drawings

In the accompanying drawings which form a part of the specification and are to be read in conjunction therewith and in which like reference numerals are used to indicate like parts in the various views:

FIG. 8 is a side elevational view of a forward transverse seal in accordance with the present invention;

FIG. 9 is an elevational view of the seal shown in FIG. 8 and taken in vertical section along line 9—9 of FIG. 2 in the direction of the arrows;

FIG. 10 is an elevational view of an aft transverse seal taken in vertical section along line 10—10 of FIG. 2 in the direction of the arrows;

FIG. 11 is an elevational view of a longitudinal seal taken along line 11—11 of FIG. 2 in the direction of the arrows;

FIG. 12 is a fragmentary top plan view of the knife gate illustrating the particle clearing action when the gate moves in the direction of the arrow; and FIG. 13 is a side elevational view of an alternate embodiment of a longitudinal seal in accordance with the present invention.

Description of the Preferred Embodiment

Figure 1:
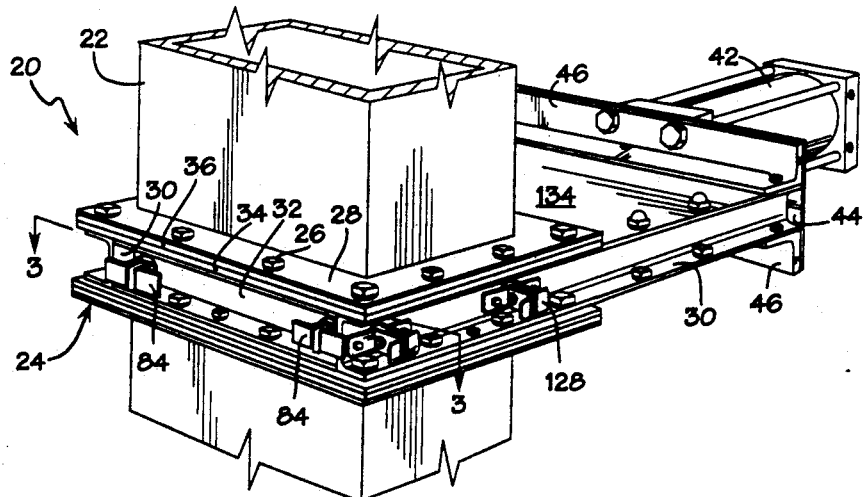
FIG. 1 is a perspective view of a knife gate valve constructed in accordance with the present invention and shown coupled with a material conveyance chute which is shown in fragment.
Figure 2:
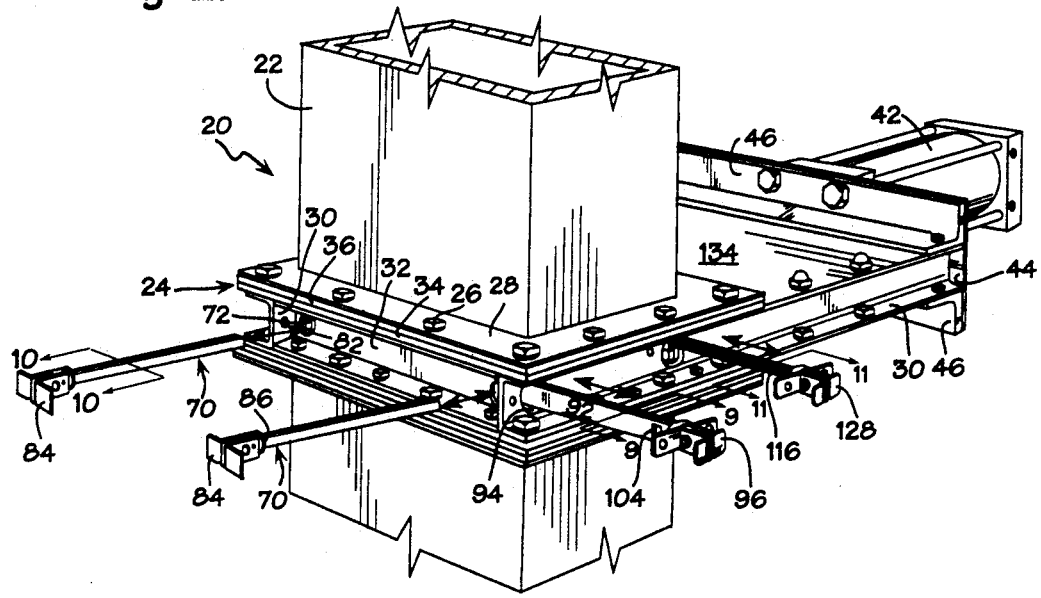
FIG. 2 is a perspective view of the knife gate valve similar to the view shown in FIG. 1 but with pressure-loaded seals shown removed from their seated positions.
Figure 3:
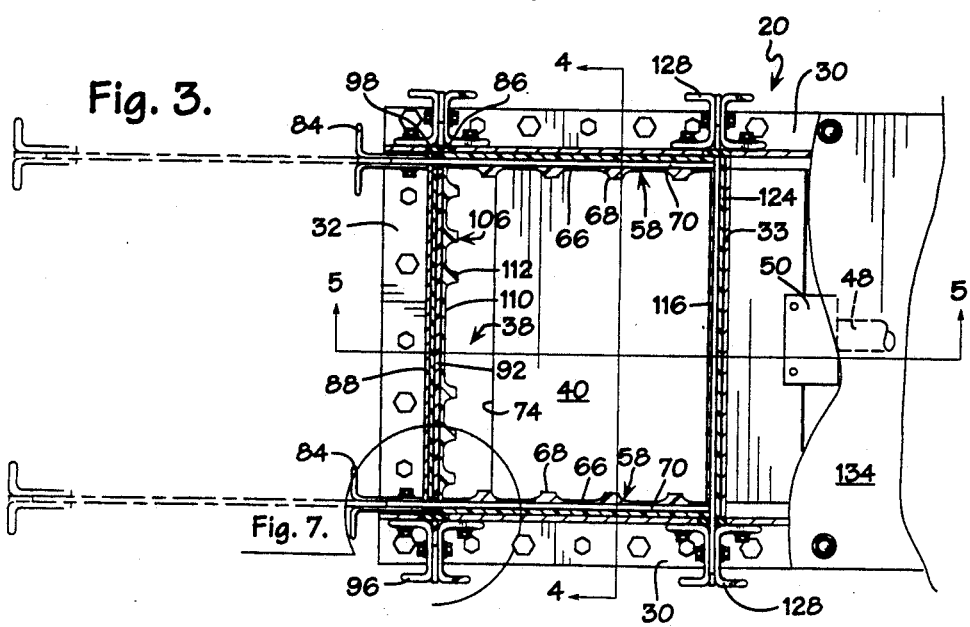
FIG. 3 is a fragmentary top plan view of the knife gate valve taken in horizontal section along line 3—3 of FIG. 1 in the direction of the arrows, with broken lines being used to illustrate the longitudinal seals after they have been removed from the valve.
Figure 4:
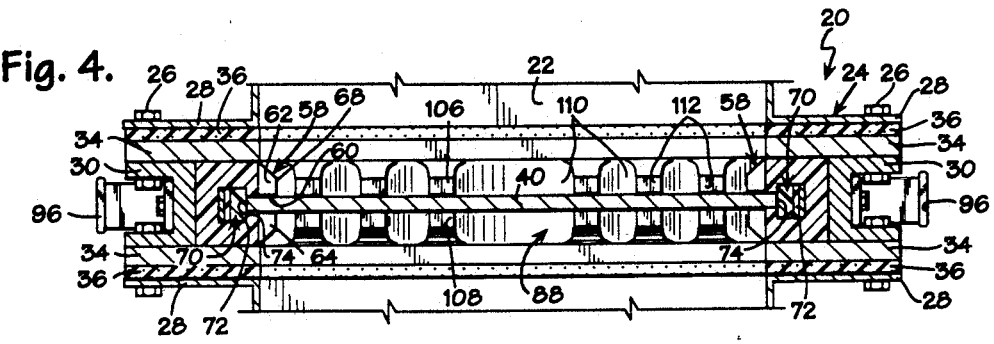
FIG. 4 is a fragmentary elevational view of the knife gate valve taken in vertical section along line 4—4 of FIG. 3 in the direction of the arrows and shown on a slightly enlarged scale.
Figure 5:
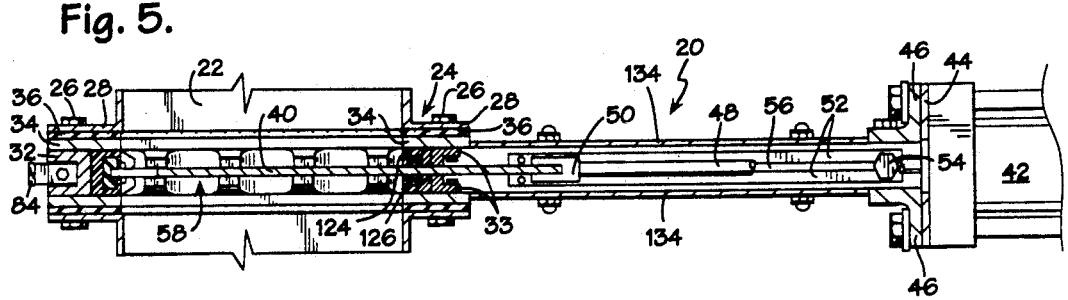
FIG. 5 is a fragmentary elevational view of the knife gate valve taken in vertical section along line 5—5 of FIG. 3 in the direction of the arrows.
Figure 6:
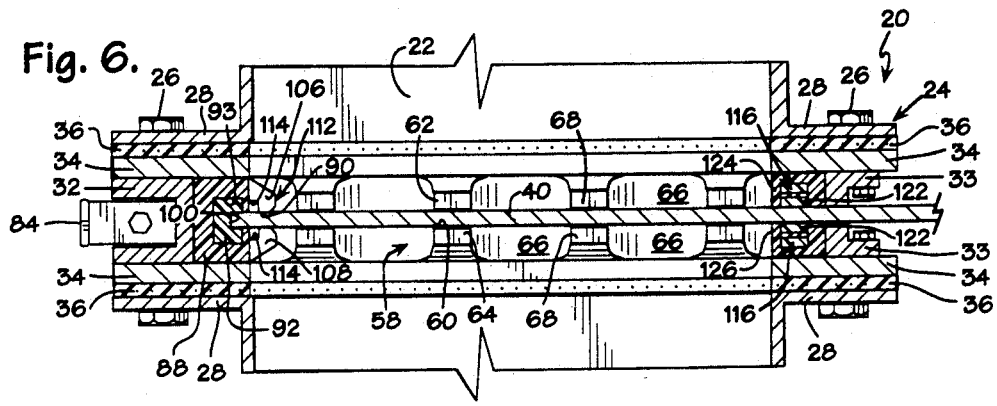
FIG. 6 is a fragmentary elevational view of the knife gate valve taken in vertical section and similar to the view shown in FIG. 5 but taken on an enlarged scale to better illustrate the construction of the knife gate valve.
Figure 7:
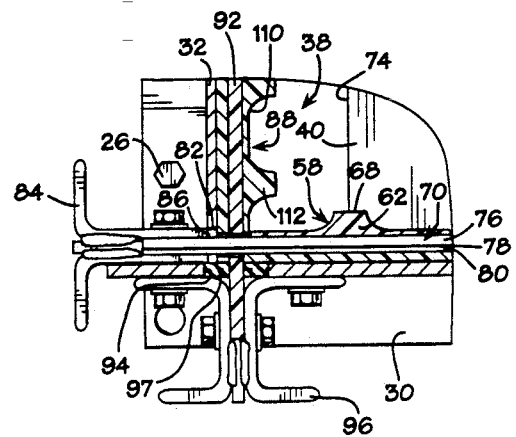
FIG. 7 is an enlarged top plan view of a fragmental portion of the knife gate valve shown within the area designated FIG. 7 in FIG. 3.

Referring now to the drawings in greater detail, and initially to FIGS. 1-7, a gate valve constructed in accordance with a preferred embodiment of the present invention is represented broadly by the numeral 20. Gate valve 20 is shown installed in a duct 22 and is operable to control the flow of material particles, typically dry powders or granules, through the duct 22. The particles may be grains and other foods, plastics or similar types of material that can be conveyed by vacuum or air pressure.

Gate valve 20 includes a frame or housing 24 which is secured by nuts and bolts 26 to peripheral flanges 28 provided on duct 22. The outer periphery of valve housing 24 comprises a pair of longitudinally extending U-shaped frame members 30 and a U-shaped forward transverse frame member 32 that extends between the longitudinal frame members 30 at a forward end thereof. As can best be seen in FIG. 6, a pair of spaced apart transverse frame members 33 are positioned aft of the forward transverse frame member 32 and likewise extend between the longitudinal frame members 30. The housing further includes reinforcing plates 34 positioned on the outer faces of frame members 30, 32 and 33. A gasket 36 is then positioned between the flange plates 34 and duct flanges 28 and nuts and bolts 26 are tightened to provide an air-tight seal between the duct 22 and housing 24.

The frame members 30, 32, and 33 generally define a rectilinear opening 38 (FIG. 3) which allows the material particles conveyed through duct 22 to pass through the gate valve 20. It will be appreciated that the size and configuration of the opening 38 can be varied as needed for the intended application of the gate valve 20. The opening 38 can be partially or completely blocked by a knife blade or gate 40 which is mounted for longitudinal movement to control the flow of particles through the gate valve 20. Reciprocating movement of the gate 40 is provided by a double-acting air cylinder 42 that is mounted to an upright plate 44 at an aft end of the gate 20. The mounting plate 44 is reinforced by a pair of transverse beams 46 which are connected to the mounting plate 44 and are secured to the opposed upper and lower faces of longitudinal frame members 30. It will be appreciated that other devices may be used in place of air cylinder 42 to cause actuation of the gate 40. For example, in certain applications the use of a manually operable handwheel may be desired or even preferred.

The gate 40 is mounted to an extensible piston rod 48 of air cylinder 42 by a suitable clamp 50. A pair of nylon guides 52 are mounted by bolts 54 to the inner faces of the longitudinal frame members 30 and extend between the mid transverse frame members 33 and the aft end of the gate valve where the air cylinder 42 is mounted. The guides 52 each includes a channel 56 which receives a portion of the side of the gate 40 to guide and support the gate as it is reciprocated.

Additional support for the gate 40 in the region along the sides of opening 38 is provided by a pair of longitudinally extending side beams 58. The side beams 58 are constructed of suitably durable materials such as nylon and may be of one-piece construction but for ease of fabrication may be formed of multiple pieces. As can best be seen in FIG. 4, each side beam 58 includes a slot 60 which is sized to receive a lateral side portion of the gate 40. Upper and lower shoulders 62 and 64 which are formed in each beam 58 by the associated slot 60 engage the upper and lower faces of the gate 40 to provide support thereto. Because the shoulders 62 and 64 are in close contact with the faces of the gate, material particles are partially or completely blocked from passing between the shoulders and the gate.

As is illustrated in FIG. 12, removal of any material which should lodge between the shoulders 62 and 64 is facilitated by a series of cutouts 66 which are spaced apart along the length of the side beams 58. The cutouts 66 form a series of projections 68 and an arcuate transition is provided between the cutouts and the projections. Material which has accumulated between the upper and lower shoulders 62 and 64 in projections 70 is carried by forward reciprocation of the gate 40 into the adjacent cutouts 66 where it is allowed to fall through the opening 38. Likewise, material which accumulates on the faces of the closed gate 40 in the area of cutouts 66 is scraped off of the gate by the projections 70 as the gate is reciprocated rearwardly.

Returning to FIG. 4, the shoulders 62 and 64 in side beams 58 are closely spaced to adequately support the gate 40 but they are not intended to provide an air-tight seal against the gate 40. Sealing action is instead provided by a longitudinal pressure-loaded seal 70 which is removably positioned within a longitudinal channel 72 formed in each side beam 58. The channel 72 is open to and is a continuation of slot 60 which extends into the side beam 58 and receives the side portion of gate 40. The seal 70 is positioned to seat only against an edge 74 of gate 40 rather than a face of the gate so that a single seal may be used to provide the desired sealing action along each side of the gate 40. This allows the seals 70 to be positioned remotely from the opening 38 through which the material particles are conveyed. Advantageously, because the seals 70 are recessed within the associated side beams 58, they are shielded by projections 70 and walls 68 from the deleterious effects of contact with the material particles conveyed through the gate valve opening 38.

Turning additionally to FIG. 10, both longitudinal seals 70 include a seal element 76 formed from a material that is able to seal against the gate 40 without being unduly worn by sliding contact with the gate. The seal element 76 is preferably formed of a hard nylon compounded with a non-toxic lubricant, although other suitable materials may be used. A compression element 78 is sandwiched between and bonded to the seal element 76 and a rigid element 80. The compression element 78 may be formed of various compressible materials which will maintain the seal element 76 in contact with the edge 74 of gate 40 during reciprocation of the gate. A compression set and temperature resistant silicone rubber compound is a preferred material for use as compression element 78. The rigid element 80 may be formed of various corrosion resistant metals or other materials which will strengthen the seal 70 and facilitate the insertion and removal of the seal 70 in the channel 72 that it is housed within.

The longitudinal seals 70 are of a length sufficient to extend completely along the sides of gate opening 38 and through an aperture 82 in the forward frame member 32. A suitable handle 84 is attached to that portion of each seal that extends outwardly from the frame member 32 to provide a finger grip that can be easily grasped during the removal of the seals 70. A plug 86 is carried on each seal 70 to close the aperture 82 when the seal 70 is fully inserted into the channel 72.

Turning again to FIGS. 3 and 5-7, the gate 40 is supported at the forward end of the opening 38 by a forward beam 88 which is similar to the side beams 58 in that it contains a slot 90 which receives the leading end of the gate 40. The slot 90 extends the width of the opening 38 and extends into the forward beam 88 a sufficient distance to allow the leading end of the gate 40 to contact a transverse seal 92 which is housed within a channel 93 formed in the forward beam 88. Transverse seal 92 is formed of a material suitable for forming a seal against the leading edge of the gate 40 when the gate is fully extended to close the opening 38. A hard nylon, including one compounded with a non-toxic lubricant, is one example of a material suitable for use as seal 92. Seal 92 can also be a pressure loaded seal similar to longitudinal seals 70 but the closing force exerted against the seal 92 by the gate 40 will generally be sufficient to provide an effective seal without the need for pressure loading.

Transverse seal 92 extends completely across the width of valve opening 38 and extends out one side of housing 24 through an aperture 94 (FIG. 2) provided in longitudinal frame member 30. A handle 96 of the general type previously described is attached to the portion of the seal 92 which extends outwardly from the frame member 30 and a plug 97 is provided to seal the aperture 94 against leakage of vacuum or pressure. The other end of the seal 92 extends to the other longitudinal frame member 30 but does not extend outwardly therefrom. In order to allow the seal 92 to be inserted and removed from both sides of the housing 24 and to facilitate cleaning of the channel 93, an aperture 98 and another plug 86 are provided in that frame member 30 and another handle 96 is removable mounted thereover. Because the transverse seal 92 has the same configuration when turned end-to-end, it can be inserted from either side of the housing 24.

Turning additionally to FIGS. 8 and 9, the transverse seal 92 includes a elongated slot 100 that receives the leading end of the gate 40 when it is fully extended. A compressible element 102 is provided at both ends of the slot 100 to prevent leakage of vacuum or pressure at the corner edges of the gate. In addition, an opening 104 is located adjacent each compressible element 102 at positions such that when the seal 92 is inserted within its associated channel 93, the openings are in alignment with the channels 72 that receive the longitudinal seals 70. The openings 104 are sized to allow the longitudinal seals 70 to be inserted and withdrawn through the openings 104 when the transverse seal 92 is in its seated position. As shown in FIG. 13, an opening 104' could alternatively be positioned in a longitudinal seal 70' at a position to allow the transverse seal 92 to be inserted through the opening 104' in the longitudinal seal 70'.

Returning to FIGS. 3-6, upper and lower shoulders 106 and 108 are formed in the forward beam 88 by the slot 90. As with side beams 58, a series of cutouts 110 and projections 112 are provided in the forward beam 88. The projections 112 provide support for the gate 40 when it is closed while the cutouts 110 cooperate with reliefs 114 formed in the facing surfaces of projections 112 to facilitate removal of any material particles as the gate 40 is reciprocated.

The aft end of the gate 40 is sealed by a pair of pressure loaded transverse seals 116 that exert a sealing pressure against the upper and lower faces of the gate. The seals 116 can be constructed in a manner similar to longitudinal seals 70 but they preferably comprise a compression element 118 that is sandwiched between two seal elements 120. The compression element 118 and seal elements 120 may be formed of the same materials previously described with respect to elements 78 and 76, respectively.

The aft transverse seals 116 are seated within channels 122 formed in upper and lower aft beams 124 and 126 that are positioned forwardly of the mid frame members 33. The seals 116 extend outwardly from opposite sides of the housing 24 and each is connected to a handle 128 of the type previously described. As can be seen in FIG. 11, the seals 116 each include a shoulder 130 that fills the end of the associated channel 122 and a plug 132 which seals the end of the channel 122.

In operation, the gate 40 is moved back and forth by operation of the air cylinder 42 to control the flow of particles through the valve opening 38. When the gate 40 is fully closed, an air-tight seal is provided by the longitudinal pressure loaded seals 70 which act against the side edges 74 of the gate, the forward transverse seal 92 that seals against the forward edge of the gate, and the aft transverse seals 116 which bear against the upper and lower faces of the gate 40. The housing of the seals 70, 92 and 116 in their recessed positions within their associated channels 72, 93 and 122 protects the seals from the abrasive effects of the material particles which flow through the gate valve 20. This can extend the life of the seals and reduce the frequency of inspection and renewal of the seals.

Advantageously, the seals 70, 92 and 116 can be removed for inspection and cleaning or renewal without having to remove the gate valve 20 from its mounting on duct 22. Removal of the seals is easily accomplished by simply unbolting the handles 84, 96 and 128 which are connected to the respective seals. The longitudinal seals 70 must be removed before the forward transverse seal 92 can be removed, but the aft transverse seals 116 can be removed in any desired order. Once the seals 70, 92 and 116 have been removed, they can be cleaned or renewed. Notably, when the seals have been removed from their associated channels 72, 93 and 122, the channels can be readily accessed through the apertures at the ends of the channels for cleaning by air-purging or other suitable methods. This allows the desired cleanliness of the sealing components to be readily maintained without required extensive disassembly of the gate valve 20 or removal of the valve from the duct 22. When the seals 70, 92 and 116 have been suitably cleaned or renewed, they are simply reinserted into the associated channels and the handles secured to the housing 24. It will be appreciated that this process allows the valve 20 to be returned to service with a minimum of operational downtime.

In addition to the ability to easily remove the seals 70, 92 and 116 for inspection, cleaning and renewal, the gate valve 20 construction significantly reduces the opportunity for material particles to accumulate in areas adjacent the seals where they may interfere with reciprocating movement of the gate 40, cause wearing of the seals, and/or cause the growth of undesired bacteria which could contaminate other particles flowing through the gate valve 20. The cutouts 66 and 110 and projections 68 and 112 which are provided in beams 58 and 88 reduce the particle accumulation by allowing the particles to be scraped off of the gate 40 and fall into the opening 38 as the gate is advanced and retracted. This clearing action at the forward beam 88 is further enhanced by the presence of relief channels 114 which allow the material particles to travel sidewardly from between the projections 112 to an adjacent cutout 110. If desired, a suitable shroud (not shown) can also be positioned over the opening 38 to direct the flowing particles centrally within the opening 38 and to scrape the particles off of the closed gate 40 as it is being opened.

Cleaning of the gate 40 itself may be easily accomplished by simply removing bonnet covers 134 which provide access to both faces of the gate 40 when it is in the retracted position. It can thus be seen that all of the gate valve components that come into contact with the material particles being conveyed through the duct 22 can be periodically cleaned without requiring removal of the valve 20 from the duct. Notably, this allows the valve 20 to be utilized in those processes requiring a high degree of cleanliness, such as those in which foods or drugs are being handled.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A gate valve for controlling the flow of solid material particles, said gate valve comprising:
   a valve housing presenting an opening through which the solid material particles may flow;
   a gate coupled with the housing and moveable between a closed position blocking the opening and an open position in which the flow opening is unblocked, said gate having opposed faces, a leading edge and longitudinal side edges;
   an actuator coupled with the gate for moving the gate between the open and closed positions;
   a pair of longitudinal channels formed in said housing adjacent said opening and at opposite sides thereof;
   longitudinal pressure loaded seals positioned within the longitudinal channels and in sealing contact with the longitudinal side edges of the gate when the gate is in the closed position; and
   a pair of apertures in said housing, one of said pair of apertures in alignment with an end of one of said pair of longitudinal channels and the other of said pair of apertures in alignment with an end of the other of said pair of longitudinal channels, said apertures being sized to permit insertion of the longitudinal pressure loaded seals through said apertures and into said channels and removal therefrom.

2. The gate valve as set forth in claim 1, including handles connected to said longitudinal pressure loaded seals and extending outwardly from said housing to facilitate removal of said seals from said channels.

3. The gate valve as set forth in claim 1, including a forward transverse seal extending between said longitudinal pressure loaded seals and positioned adjacent a forward end of said opening for sealingly engaging said leading edge of said gate when the gate is in the closed position.

4. The gate valve as set forth in claim 3, including a transverse channel formed in said housing for receiving said forward transverse seal and an aperture in said housing in alignment with an end of said transverse channel, said aperture being sized for allowing insertion of said forward transverse seal through said aperture and into said transverse channel and removal therefrom.

5. The gate valve as set forth in claim 4, including a seal opening in said forward transverse seal, said seal opening being sized and positioned to allow one of the pair of longitudinal pressure loaded seals to be inserted through said seal opening.

6. The gate valve as set forth in claim 5, including another seal opening in said forward transverse seal, said another seal opening being sized and positioned to allow the other of the pair of longitudinal pressure loaded seals to be inserted through said seal opening.

7. The gate vale as set forth in claim 4, including a seal opening in one of said pair of longitudinal pressure loaded seals, said seal opening being sized and positioned to allow said forward transverse seal to be inserted through said seal opening.

8. The gate valve as set forth in claim 4, including a handle connected to said forward transverse seal and extending outwardly from said housing to facilitate insertion and removal of said forward transverse seal.

9. The gate valve as set forth in claim 8, including aft transverse seals within said housing adjacent said opening at an end thereof opposite from said forward transverse seal, said aft transverse seals positioned for being in sealing contact with said opposed faces of said gate.

10. The gate valve as set forth in claim 4, including longitudinal side beams positioned along the sides of said opening and containing said longitudinal channels at positions recessed from said opening, said longitudinal side beams having a slot formed therein in communication with said longitudinal channels and sized for closely receiving portions of said gate.

11. The gate valve as set forth in claim 10, including alternating cutouts and projections in said longitudinal side beams, said projections being shaped for scraping said solid material particles from a portion of one of said faces of said gate into said cutouts and into said opening in the valve housing.

12. The gate valve as set forth in claim 11, including a forward beam in which said transverse channel and said forward transverse seal are housed, said forward beam including a slot in communication with said transverse channel for receiving said leading edge of the gate, said forward beam including alternating cutouts and projections.

13. A gate valve for controlling the flow of solid material particles, said gate valve comprising:
- a valve housing presenting an opening through which the solid material particles may flow;
- a gate coupled with the housing and moveable between a closed position blocking the opening and an open position in which the flow opening is unblocked, said gate having opposed faces, a leading edge and longitudinal side edges;
- an actuator coupled with the gate for moving the gate between the open and closed positions;
- a pair of side beams positioned along opposite sides of said opening;
- longitudinal channels recessed within the side beams and extending therealong;
- slots in said side beams and in communication with said longitudinal channels, said slots being positioned for receiving portions of said gate;
- longitudinal pressure loaded seals positioned within the longitudinal channels and in sealing contact with the longitudinal edges of the gate when the gate is in the closed position;
- an opening in said housing in alignment with an end of one of said longitudinal channels to permit longitudinal removal and insertion of the longitudinal pressure loaded seal within said channel.

14. The gate valve as set forth in claim 13, including handles connected to said longitudinal pressure loaded seals and extending outwardly from said housing to facilitate removal of said seals from said channels.

15. The gate valve as set forth in claim 13, including a forward transverse seal extending between said longitudinal pressure loaded seals and positioned adjacent a forward end of said opening for sealingly engaging said leading edge of said gate when the gate is in the closed position.

16. The gate valve as set forth in claim 15, including a transverse channel formed in said housing for receiving said forward transverse seal and an aperture in said housing in alignment with an end of said transverse channel, said aperture being sized for allowing insertion of said forward transverse seal through said aperture and into said transverse channel and removal therefrom.

17. The gate valve as set forth in claim 16, including a seal opening in said forward transverse seal, said seal opening being sized and positioned to allow one of the pair of longitudinal pressure loaded seals to be inserted through said seal opening.

18. The gate valve as set forth in claim 17, including another seal opening in said forward transverse seal, said another seal opening being sized and positioned to allow the other of the pair of longitudinal pressure loaded seals to be inserted through said seal opening.

19. The gate valve as set forth in claim 16, including a seal opening in one of said pair of longitudinal pressure loaded seals, said seal opening being sized and positioned to allow said forward transverse seal to be inserted through said seal opening.

20. The gate valve as set forth in claim 16, including a handle connected to said forward transverse seal and extending outwardly from said housing to facilitate insertion and removal of said forward transverse seal.

21. The gate valve as set forth in claim 20, including aft transverse seals within said housing adjacent said opening at an end thereof opposite from said forward transverse seal, said aft transverse seals positioned for being in sealing contact with said opposed faces of said gate.

22. The gate valve as set forth in claim 21, including alternating cutouts and projections in said longitudinal side beams, said projections being shaped for scraping said solid material particles from a portion of one of said faces of said gate into said cutouts and into said opening in the valve housing.

23. The gate valve as set forth in claim 22, including a forward beam in which said transverse channel and said forward transverse seal are housed, said forward beam including a slot in communication with said transverse channel for receiving said leading edge of the gate, said forward beam including alternating cutouts and projections.

* * * * *